Patented May 15, 1951

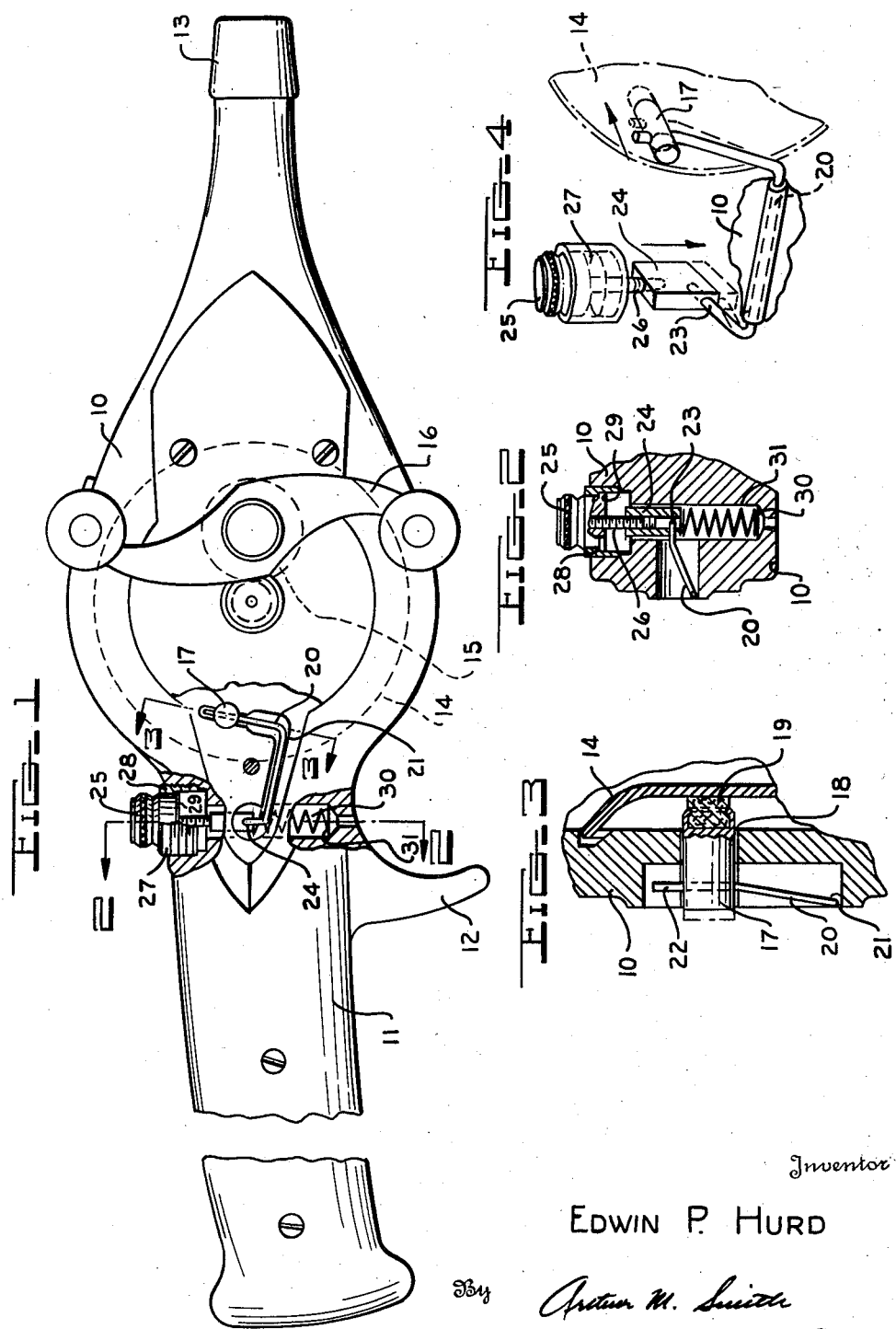

2,553,414

UNITED STATES PATENT OFFICE 2,553,414

FISHING REEL

Edwin P. Hurd, Detroit, Mich., assignor to Hurd Lock and Manufacturing Company, Detroit, Mich., a corporation of Michigan Application June 1, 1946, Serial No. 673,761

2 Claims. (Cl. 43—20)

The present invention relates to a fishing reel and more particularly to a fishing reel in which the speed of rotation of the line spool is readily controlled at all times by the user.

The principal objects of the present invention are:

1. To provide a fishing reel in which a combined adjustable drag and manually actuated brake mechanism is utilized to assure control of the speed of rotation of the line spool.

2. To provide a fishing reel having an enclosed combined drag and manually applied brake for controlling the speed of rotation of the line spool, the reel being characterized by its relative simplicity, making for the economical mass production manufacture thereof; its rugged construction, making for dependability and long life in service; and its responsiveness to all applied pressures to assure the application of a definite and positively controlled braking force on the flanged portion of the line spool.

3. To provide a fishing reel in which an adjustable drag is combined with a positive, manually applied, mechanical brake to control both the speed of rotation of the line spool and the positive stopping of such rotation when desired, the brake applying mechanism being simple in its construction and positive in its operation while being readily controlled by the user through a conveniently located adjustable brake applying member.

Other objects of this invention will appear in the following description and appended claims, reference being had to the accompanying drawings forming a part of this specification wherein like reference characters designate corresponding parts in the several views.

In the drawings:

Fig. 1 is a fragmentary side elevation with parts broken away showing one type of fishing reel incorporating the combined adjustable drag and brake mechanism of the present invention.

Fig. 2 is a fragmentary cross-section taken substantially on the line 2—2 of Fig. 1 looking in the direction of the arrows.

Fig. 3 is a fragmentary cross-section taken substantially on the line 3—3 of Fig. 1 looking in the direction of the arrows.

Fig. 4 is a schematic view showing the operating mechanisms and linkages of the combined adjustable drag and brake mechanism of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

It is understood that the combined adjustable drag and brake mechanism of the present invention may be applied to any desired type of fishing reel mechanism in which a rototable line spool is mounted in a reel housing. In the drawings I have shown the combined adjustable drag and brake mechanism as applied to a new type of reel, the structural details of which are more fully disclosed in my co-pending application, Serial No. 675,388, filed June 8, 1946. Since the present invention is concerned primarily with the combined adjustable drag and brake mechanism, I have deemed it advisable in the interest of simplicity not to show in this application the details of the reel mechanism itself but have shown only those parts of the reel mechanism which are necessary to explain fully the construction and operation of the combined adjustable drag and brake mechanism of the present invention.

Referring to Fig. 1, the fishing reel there shown and with which the present invention may be utilized comprises a body housing 10 having a pistol type handle 11 which overlies a rigid gripping trigger 12 at one end. The other end of the body housing 10 terminates in a rod ferrule seat 13. A line spool (not shown) is journaled for rotation in the housing 10 and has dished flat ends, one of which is indicated at 14. The line spool is operatively connected through a gear train 15 (shown in dotted line only) with a double crank spool winding handle 16.

When a fishing reel, such as that here shown, is used for bait, fly, or plug casting, it is desirable to control the speed of rotation of the line spool in accordance with the variable conditions of each cast. For many years fishermen have controlled the spool rotation speed by "thumbing" the spool at the point where the line is wound on the spool. While this method has the advantage of being a ready control for the speed of the spool during each cast and allows the user to compensate for the variable factors involved in each cast, it has a wearing effect on the line and also affects the winding of the line on the spool.

Recently, reels have been placed on the market in which a so-called "automatic thumbing" device is provided, usually in the form of an adjustable drag which may be adjusted in advance of each cast to compensate for certain of the factors such as the weight of the bait, plug, or fly. However, in the use of such adjustable drag devices, it is necessary for the user to rely upon thumbing of the spool in order to control the speed of the spool during the actual cast.

The variation in the weights of artificial lures, baits, and the like, will cause rotation of the line spool at various speeds. This is a relatively fixed factor in each cast with a particular lure, bait or the like and may be compensated for by adjustments of the drag mechanism prior to the cast. Other factors which influence the spool speed during each cast are variable factors during each cast and include wind velocity and direction, the skill of the fisherman, weeds, water conditions, and the like. Each of these variable factors must be compensated for by the fisherman largely during the interval of each cast of the lure, bait, or the like. The combination of the relatively fixed factors and the variable factors frequently causes rotation of the line spool in such a manner that the inertia of the spool will cause it to continue to rotate after the bait, lure, or fly ceases to carry out the line on the cast. In this instance, the overrunning of the spool causes tangles in the line or looseness of the line on the core of the spool so that subsequent casts are impaired by loose lines, back lashes, and the like. In the instances where a fixed drag is provided to retard the free running of the spool, the length of the cast may be cut down. While such so-called "mechanical thumbing" drag devices simulate the operator's thumb in operation so far as concerns the application of retarding force on the line spool, such devices act only to provide a fixed amount of friction causing a predetermined amount of retardation on the rotation of the spool. They do not, as previously pointed out, provide a brake mechanism which may be mechanically applied at the option of the operator in order to increase the amount of drag or to bring the spool to a complete stop during the cast in order to compensate for the variable factors which may be involved in each cast. The adjustment of the "mechanical thumbing" devices provides a fixed amount of drag on each cast and there is no control or variation of this amount of drag during the cast so as to assure the optimum operation of the reel. It is important that length of the cast be not unduly impaired by the amount of the fixed drag applied, yet the free running spool must be readily controlled in order to prevent its over-running of the line.

According to the present invention I have provided a combined adjustable drag and manually applied mechanical brake which, as shown in the drawings, comprises a brake member 17 in the form of a cylindrical plunger member mounted for reciprocation in an orifice 18 in the housing 10. A facing 19 of brake friction material, such for example as chrome tanned leather or the like, is mounted on one end of the brake member 17 and is moved into frictional surface contact with the braking surface of the dished spool end 14 when the brake or drag is applied. As here shown, the frictional surface is brought into engagement with the enclosed braking surface of the dished spool end 14 at a point near its periphery so that the braking force is applied and effectively distributed over a large area on the spool end, thus reducing localized wear and permitting the maximum braking effect from a minimum amount of braking effort exerted through the brake mechanism.

Movement of the brake member 17 into brake applying position is under the control of the operator through a brake linkage which comprises a resilient brake arm 20 which extends through a brake arm channel 21 in the housing 10. The brake arm channel 21 acts as a bearing in which the resilient brake arm 20 is journaled. One end 22 of the arm 20 is connected with the brake member 17, as for example, by extending through a hole drilled in the end of the said brake member 17. The other end, 23, of the arm 20 is attached to a brake connector plate 24 which is connected with an adjustable brake applying button 25 by means of a screw threaded shank 26 which is secured to the button 25 and has a screw threaded engagement with the brake connector plate 24.

The adjustable brake applying button 25 is mounted in a bushing 27, which in the present instance is screw threaded into the body of the housing 10, but which in other instances may be a pressed fit member. The bushing 27 is provided with an inturned end flange 28 which is adapted to contact an enlarged collar 29 on the base portion of the button 25. A coil spring 30 is seated in a spring pocket 31 which is provided in the housing 10 and exerts a resilient pressure directed upwardly on the bottom of the connector plate 24 to hold the button 25 in its raised position so that the collar 29 contacts the inturned end flange 28 of the bushing 27 at all times. This permits the button 25 to be depressed by pressures exerted thereon by the user.

By rotation of the button 25 the connector plate 24 is raised or lowered in relation to the bottom of the button 25 and thus moves the brake arm 20, either to move the brake member 17 out of or into frictional engagement with the end 14 of the spool. If it is desired to provide a drag on the spool, this is accomplished by adjustment of these mechanisms by turning the button 25 so as to move the brake member 17 into the desired amount of engagement with the end 14 of the spool member. Thus, the amount of frictional contact between the brake member 17 and the end 14 of the spool is controlled by the adjustment of the button 25. After the amount of drag is thus adjusted to provide the minimum drag desired, added drag or braking pressures may be applied on the spool during the cast by the exertion of pressures on the button 25 to effect its depression. The pressures on the button 25 are yieldably resisted by the spring 30 so that a cushioned or resilient braking effect is achieved at all times.

If it is desired to stop rotation of the spool completely, this is achieved at any time by exerting additional pressures on the button 25 so as to cause the connector plate 24 to move downwardly in the direction of the arrows as shown in Fig. 4 and this movement causes the brake applying member 20 to move the brake member 17 from its full line position to the dotted line position there shown, and thus to apply a braking force on the end 14 of the spool.

Thus it will be seen that the present invention provides a readily adjustable drag on the spool member of the reel and at the same time permits control of the spool rotation during each casting operation so that the actual speed of rotation of the spool is at all times under the positive control of the operator. It will also be seen that the combined adjustable drag and brake mechanism here disclosed is completely enclosed within the reel housing and within the flanged end of the spool. Hence water, dirt, grit, oil, and the like cannot affect the desired operation of either the drag or the brake mechanism. It will be apparent that the combined adjustable drag and brake mechanism of the present invention may be applied to any desired type of fishing reel merely by providing the necessary openings in the reel housing to accommodate the parts of the mechanism here disclosed.

I claim:

1. In a fishing reel having a housing and a rotatable line spool journaled therein, a combined drag and brake mechanism actuated and controlled by the operator during a cast to control the rotation of said spool, said drag and brake mechanism comprising a push button mounted for rotational and axial movements for actuating a brake member, said brake member having an end in frictional engagement with said spool, a brake arm having its one end in operable relation with said brake member for actuating same, said brake arm having its other end threadedly secured to said push button to be moved axially with respect thereto on rotation of said push button for adjusting the constant friction drag of said brake member on said spool, and said brake arm being operable in response to axial movements of said push button to apply a manually controlled variable braking effect on said spool.

2. A combined drag and brake for the spool of a fishing reel mounted in an integral reel housing and handle structure comprising a friction brake member mounted within said housing for movement relative to said spool for frictionally engaging the latter, a push button mounted for rotational and axial movements in said handle for actuating said brake member, a brake arm having its one end in operable relation with said brake member for actuating same, said brake arm having its other end operatively secured to said push button to be moved axially with respect thereto on rotation of said push button for adjusting the constant friction drag of said brake member on said spool, and said brake arm being operable in response to axial movements of said push button to apply a manually controlled variable braking effect on said spool.

EDWIN P. HURD.

REFERENCES CITED

The following references are of record in the file of this patent:

UNITED STATES PATENTS

| Number | Name | Date |
|---|---|---|
| 369,622 | Titus, Jr. | Sept. 6, 1887 |
| 422,786 | Holzmann | Mar. 4, 1890 |
| 1,204,856 | From | Nov. 14, 1916 |
| 1,299,959 | Keyser | Apr. 8, 1919 |
| 1,948,333 | Case | Feb. 20, 1934 |
| 2,208,493 | Brett | July 16, 1940 |

FOREIGN PATENTS

| Number | Country | Date |
|---|---|---|
| 4,876 of 1910 | Great Britain | Nov. 10, 1910 |